(12) United States Patent
Lussem et al.

(10) Patent No.: US 6,677,003 B2
(45) Date of Patent: *Jan. 13, 2004

(54) LIQUID-CRYSTALLINE MEDIUM

(75) Inventors: Georg Lussem, Ober-Ramstadt (DE); Dagmar Klement, Gross-Zimmern (DE); Volker Reiffenrath, Rossdorf (DE)

(73) Assignee: Merck Patent Gesellschaft mit, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/982,188

(22) Filed: Oct. 19, 2001

(65) Prior Publication Data

US 2002/0090469 A1 Jul. 11, 2002

(30) Foreign Application Priority Data

Oct. 20, 2000 (DE) .......................... 100 51 995

(51) Int. Cl.$^7$ .................. C09K 19/30; C09K 19/34; C09K 19/12
(52) U.S. Cl. .............. 428/1.1; 252/299.61; 252/299.63; 252/299.66
(58) Field of Search ..................... 428/1.1; 252/299.63, 252/299.61, 299.66

(56) References Cited

U.S. PATENT DOCUMENTS 6,171,665 B1    1/2001    Heckmeier et al.

FOREIGN PATENT DOCUMENTS

DE    4006921 A1    9/1990

*Primary Examiner*—Shean C. Wu
(74) *Attorney, Agent, or Firm*—Millen, White, Zelano, Branigan, P.C.

(57) ABSTRACT

A liquid-crystalline medium based on a mixture of polar compounds of positive dielectric anisotropy, characterized in that it comprises one or more compounds of the formula I

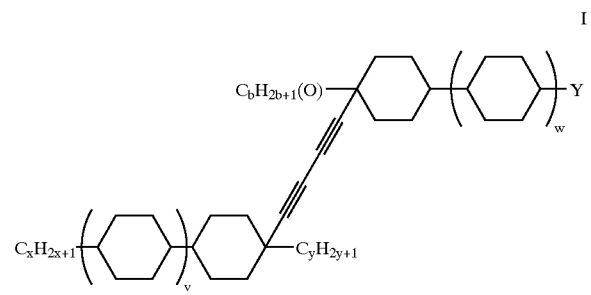

and one or more compounds of the formula IA

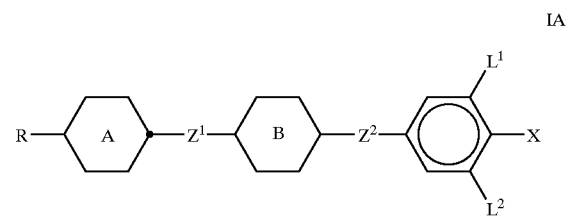

in which

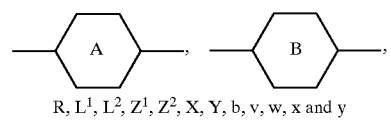

$R, L^1, L^2, Z^1, Z^2, X, Y, b, v, w, x$ and $y$ are as defined herein, is suitable for use in MLC, TN and STN displays.

32 Claims, No Drawings

LIQUID-CRYSTALLINE MEDIUM

The present invention relates to a liquid-crystalline medium, to the use thereof for electro-optical purposes, and to displays containing this medium.

Liquid-crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (super-birefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and lower vapor pressure are desired.

Matrix liquid-crystal displays of this type are known. Non-linear elements which can be used for individual switching of the individual pixels are, for example, active elements (i.e. transistors). The term "active matrix" is then used, where a distinction can be made between two types:

1. MOS (metal oxide semiconductor) or other diodes on a silicon wafer as substrate.
2. Thin-film transistors (TFTs) on a glass plate as substrate.

The use of single-crystal silicon as substrate material restricts the display size, since even modular assembly of various part-displays results in problems at the joins.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully color-capable displays, in which a mosaic of red, green and blue filters is arranged in such a way that a filter element is opposite each switchable pixel.

The TFT displays usually operate as TN cells with crossed polarizers in transmission and are illuminated from the back.

The term MLC displays here covers any matrix display with integrated non-linear elements, i.e., besides the active matrix, also displays with passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, Sept. 1984: A 210–288 Matrix LCD Controlled by Double Stage Diode Rings, p. 141 ff, Paris; STROMER, M., Proc. Eurodisplay 84, Sept. 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not meet today's requirements.

SUMMARY OF THE INVENTION

There thus continues to be a great demand for MLC displays having very high specific resistance at the same time as a large working-temperature range, short response times even at low temperatures and low threshold voltage which do not have these disadvantages, or only do so to a reduced extent.

In TN (Schadt-Helfrich) cells, media are desired which facilitate the following advantages in the cells:

extended nematic phase range (in particular down to low temperatures)

long shelf life, even at extremely low temperatures the ability to switch at extremely low temperatures (outdoor use, automobile, avionics)

increased resistance to UV radiation (longer service life).

The media available from the prior art do not allow these advantages to be achieved while simultaneously retaining the other parameters.

In the case of supertwisted (STN) cells, media are desired which enable greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

An object of the invention is to provide media, in particular for MLC, TN or STN displays of this type, which do not have the above-mentioned disadvantages or only do so to a reduced extent, and preferably simultaneously have very high specific resistances and low threshold voltages.

Upon further study of the specification and appended claims, further objects and advantages of this invention will become apparent to those skilled in the art.

It has now been found that these objects can be achieved if media according to the invention are used in displays.

The invention thus relates to a liquid-crystalline medium based on a mixture of polar compounds of positive dielectric anisotropy, characterized in that it comprises one or more compounds of the formula I

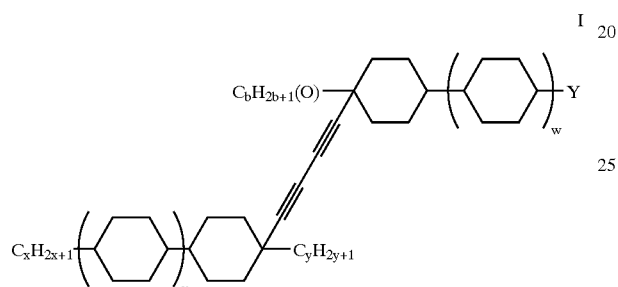

I and one or more compounds of the formula IA

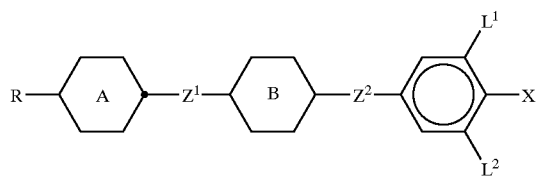

IA in which the individual radicals have the following meanings:

| | |
|---|---|
| a, b, x and y | are each, independently of one another, from 0 to 10, |
| v and w | are each, independently of one another, 0 or 1, |
| R | is an alkyl radical having up to 12 carbon atoms, which is unsubstituted or substituted by halogen, CN or $CF_3$, and in which one or more $CH_2$ groups in these radicals may also be replaced, in each case independently of one another, by —CH=CH—, —C≡C—, —O—, —CO—O— or —O—CO— in such a way that O atoms are not linked directly to one another, |
| X | is F, Cl, CN, $SF_5$, a halogenated alkyl radical, a halogenated alkenyl radical, a halogenated alkoxy radical or a halogenated alkenyloxy radical having up to 6 carbon atoms, |
| Y | is $C_aH_{2a+1}$, $CF_3$, $OCF_3$, $OCHF_2$, $OCF_2CHFCF_3$, $SF_5$, F or Cl, |
| $Z^1$ and $Z^2$ | are each, independently of one another, —$CF_2O$— or a single bond, where $Z^1 \neq Z^2$, |

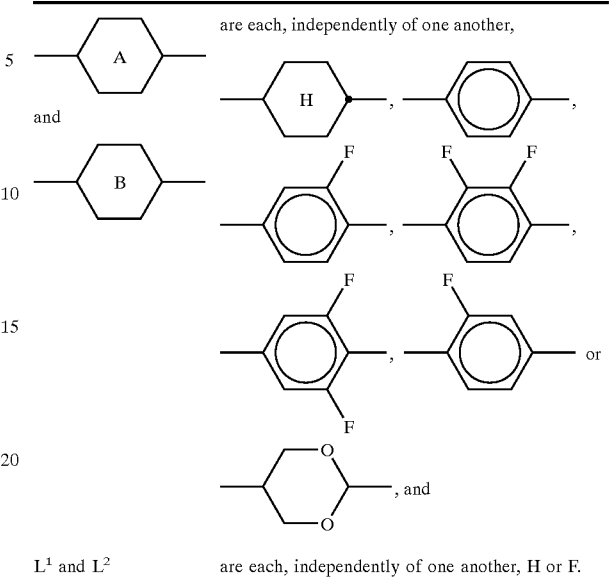

| | |
|---|---|
| $L^1$ and $L^2$ | are each, independently of one another, H or F. |

The compounds of the formulae I and IA have a broad range of applications. Depending on the choice of substituents, these compounds can serve as base materials of which liquid-crystalline media are predominantly composed; however, it is also possible to add compounds of the formulae I and IA to liquid-crystalline base materials from other classes of compound in order, for example, to modify the dielectric and/or optical anisotropy of a dielectric of this type and/or in order to optimize its threshold voltage and/or its viscosity. The mixtures according to the invention having low Δ values are used, in particular, in reflective displays.

In the pure state, the compounds of the formulae I and IA are colorless and form liquid-crystalline mesophases in a temperature range which is favorably located for electro-optical use. They are stable chemically, thermally and to light.

The compounds of the formula I are known, for example, from DE-A-19857504. The mixtures according to the invention preferably comprise one or two compounds of the formula I. The compounds of the formula I preferably have a Δε of ≦0.

Preferred mixtures comprise one or more compounds of the formulae I1 to I6:

I1

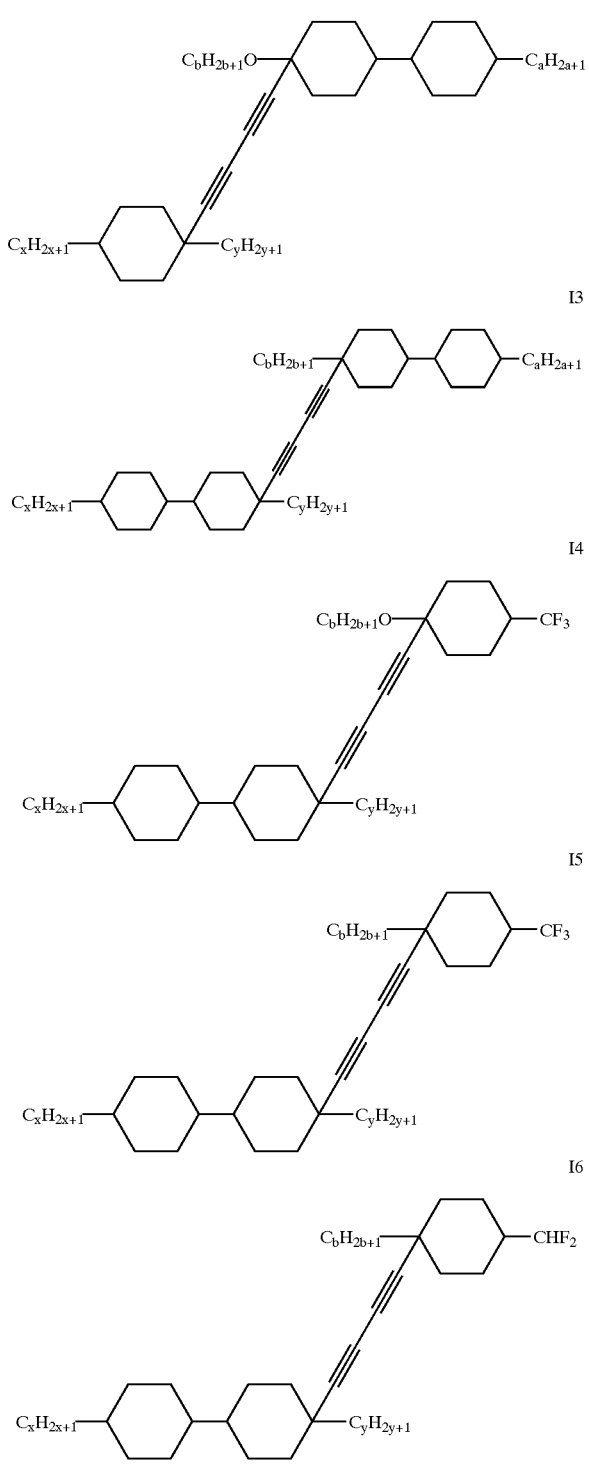

If R in the compound of the formula IA is an alkyl radical and/or an alkoxy radical, this may be straight-chain or branched. It is preferably straight-chain, has 2, 3, 4, 5, 6 or 7 carbon atoms and accordingly is preferably ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6-7-oxaoctyl, 2-, 3-,4-, 5-, 6-, 7- or 8-oxanonyl, or 2-, 3-, 4-, 5-, 6-, 7-, 8- or 9-oxadecyl.

If R is an alkyl radical in which one $CH_2$ group has been replaced by —CH=CH—, this may be straight-chain or branched. It is preferably straight-chain and has 2 to 10 carbon atoms. Accordingly, it is in particular vinyl, prop-1- or prop-2-enyl, but-1-, -2- or -3-enyl, pent-1-, -2-, -3- or -4-enyl, hex-1-, -2-, -3-, 4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- dec-1-, -2-, -3-, -4-, -5-, -6-, -7-, -8- or -9-enyl.

If R is an alkyl radical in which one $CH_2$ group has been replaced by —O— and one has been replaced by —CO—, these are preferably adjacent. These thus contain an acyloxy group —CO—O— or an oxycarbonyl group —O—CO. These are preferably straight-chain and have 2 to 6 carbon atoms.

Accordingly, they are in particular acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 3-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

If R is an alkyl radical in which one $CH_2$ group has been replaced by unsubstituted or substituted —CH=CH— and an adjacent $CH_2$ group has been replaced by CO or CO—O or O—CO, this may be straight-chain or branched. It is preferably straight-chain and has 4 to 12 carbon atoms. Accordingly, it is in particular acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryoyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If R is an alkyl or alkenyl radical which is monosubstituted by CN or $CF_3$, this radical is preferably straight-chain. The substitution by CN or $CF_3$ is in any desired position.

If R is an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

Compounds containing branched wing groups R may occasionally be of importance owing to better solubility in the conventional liquid-crystalline base materials, but in particular as chiral dopants if they are optically active. Smectic compounds of this type are suitable as components of ferroelectric materials.

Branched groups of this type generally contain not more than one chain branch. Preferred branched radicals R are isopropyl, 2-butyl (=1-methyl-propyl), isobutyl (=2-methylpropyl), 2-methylbutyl, isopentyl (=3-methyl-butyl), 2-methylpentyl, 3-methylpentyl, 2-ethylhexyl, 2-propylpentyl, isopropoxy, 2-methylpropoxy, 2-methylbutoxy, 3-methylbutoxy, 2-methyl-pentoxy, 3-methylpentoxy, 2-ethylhexyloxy, 1-methylhexyloxy and 1-methylheptyloxy.

If R is an alkyl radical in which two or more $CH_2$ groups have been replaced by —O— and/or —CO—O—, this may be straight-chain or branched. It is preferably branched and has from 3 to 12 carbon atoms. Accordingly, it is in particular biscarboxymethyl, 2,2-biscarboxyethyl, 3,3-biscarboxy-propyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)-ethyl, 3,3-bis(methoxycarbonyl)propyl, 4,4-bis(methoxycarbonyl) butyl, 5,5-bis(methoxycarbonyl)pentyl, 6,6-bis(methoxycarbonyl)hexyl, 7,7-bis-(methoxycarbonyl)heptyl, 8,8-bis(methoxycarbonyl)octyl, bis(ethoxy-carbonyl)methyl, 2,2-bis(ethoxycarbonyl)ethyl, 3,3-bis(ethoxycarbonyl)-propyl, 4,4-bis(ethoxycarbonyl)butyl or 5,5-bis(ethoxycarbonyl)hexyl.

If X is a halogenated alkyl, alkenyl, alkoxy or alkenyloxy radical, the halogen substituents are preferably F or Cl, especially F.

The compounds of the formulae I and IA are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail. The compounds of the formula IA are known, for example, from DE-A-40 06 921.

The invention also relates to electro-optical displays (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high specific resistance which is located in the cell) which contain media of this type, and to the use of these media for electro-optical purposes.

The liquid-crystal mixtures according to the invention enable a significant widening of the available parameter latitude.

The achievable combinations of clearing point, viscosity at low temperature, thermal and UV stability and dielectric anisotropy are far superior to previous materials from the prior art.

The requirement for a high clearing point, a nematic phase at low temperature and a high $\Delta\epsilon$ has hitherto only been achieved to an inadequate extent. Although mixtures such as, for example, ZLI-3119 have a comparable clearing point and comparably favorable viscosities, they have, however, a $\Delta\epsilon$ of only +3.

Other mixture systems have comparable viscosities and $\Delta\epsilon$ values, but only have clearing points in the region of 60° C.

The liquid-crystal mixtures according to the invention, while retaining the nematic phase down to −20° C. and preferably down to −30° C., particularly preferably down to −40° C., enable clearing points above 70° C., preferably above 80° C., particularly preferably above 85° C., simultaneously dielectric anisotropy values $\Delta\epsilon$ of $\geq 6$, preferably $\geq 8$, and a high value for the specific resistance to be achieved, enabling excellent STN and MLC displays to be obtained. In particular, the mixtures are characterised by low operating voltages. The TN thresholds are below 1.8 V, preferably below 1.6 V, particularly preferably <1.4 V.

It goes without saying that, through a suitable choice of the components of the mixtures according to the invention, it is also possible for higher clearing points (for example above 110°) to be achieved at a higher threshold voltage or lower clearing points to be achieved at lower threshold voltages with retention of the other advantageous properties. At viscosities correspondingly increased only slightly, it is likewise possible to obtain mixtures having greater $\Delta\epsilon$ and thus lower thresholds. The MLC displays according to the invention can utilize different electro-optical effects. Thus, inter alia, TN displays at the first Gooch and Tarry transmission minimum [C. H. Gooch and H. A. Tarry, Electron. Lett. 10, 2–4, 1974; C. H. Gooch and H. A. Tarry, Appl. Phys., Vol. 8, 1575–1584, 1975] are used, where, besides particularly favorable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. This enables significantly higher specific resistances to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

However, particular preference is given to MLC displays which use, as electro-optical effect, the so-called axially symmetric mode, ASM for short, and displays which use untwisted or virtually untwisted liquid-crystal layers having a planar alignment, such as, for example, in the advanced super view, ASV for short. In the ASM, the polarizer setting is preferably 45° to the preferential alignment of the liquid crystals. The two last-mentioned effects are particularly preferred since they result in extremely favorable viewing-angle dependences. The liquid-crystal mixtures according to the invention are particularly suitable for displays of this type owing to their low birefringence. This also and in particular applies to reflective displays, which generally require the lowest possible birefringence values.

The flow viscosity $v_{20}$ at 20° C. of the mixtures according to the invention is preferably <60 mm$^2 \cdot$s$^{-1}$, particularly preferably <50 mm$^2 \cdot$s$^{-1}$. The rotational viscosity $\gamma_1$ at 20° C. of the mixtures according to the invention is preferably <250 mPa·s, particularly preferably <220 mPa·s. The nematic phase range is preferably at least 90°, in particular at least 100°. This range preferably extends at least from −20° to +80°.

A short response time is desired in liquid-crystal displays. This applies in particular to displays which are capable of video reproduction. For displays of this type, response times (sum: $t_{on}+t_{off}$) of at most 25 ms are required. The upper limit of the response time is determined by the image refresh frequency. Besides the rotational viscosity $\gamma_1$, the tilt angle also affects the response time. In particular, mixtures comprising $\geq 20\%$ of the compounds of the formula IA exhibit a tilt angle of >2.5, preferably >3.0, compared with the commercial product ZLI-4792 from Merck KGaA.

Measurements of the capacity holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula IA exhibit a significantly smaller decrease in the HR with increasing temperature than, for example, analogous mixtures comprising cyanophenyl-cyclohexanes of the formula

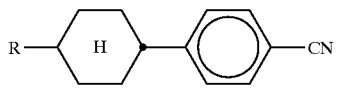

or esters of the formula

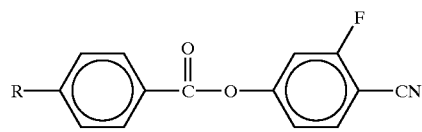

instead of the compounds of the formula IA.

The UV stability of the mixtures according to the invention is also considerably better, i.e. they exhibit a significantly smaller decrease in the HR on exposure to UV.

Particularly preferred compounds of the formula IA are compounds of the formulae IA-1 to IA-11:

IA-1

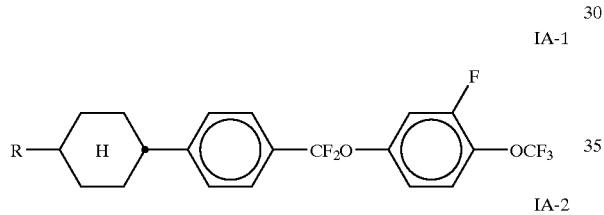

IA-2

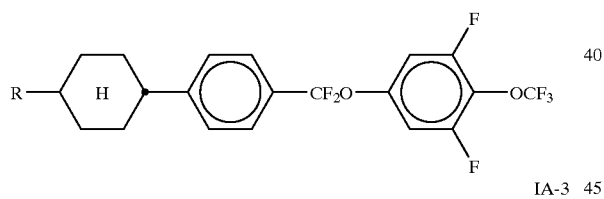

IA-3

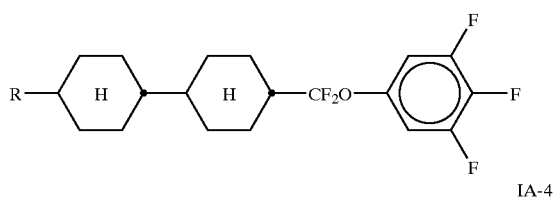

IA-4

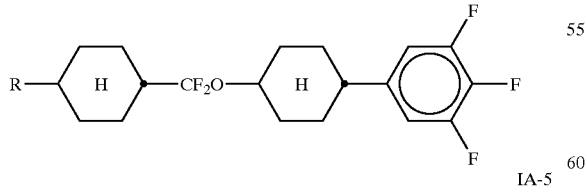

IA-5

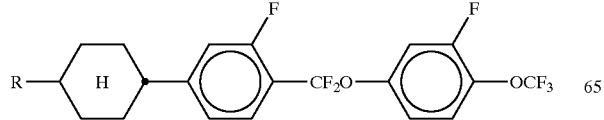

IA-6

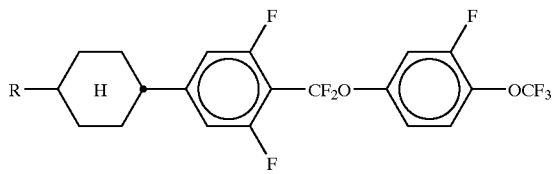

IA-7

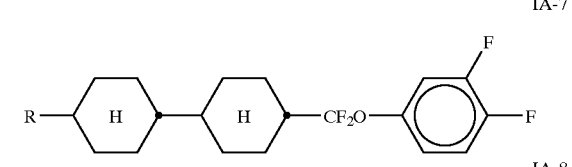

IA-8

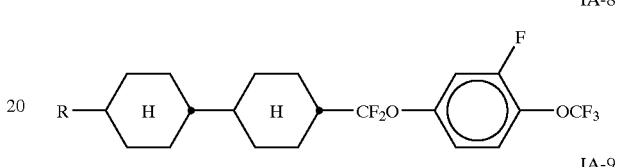

IA-9

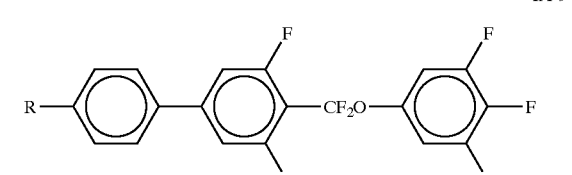

IA-10

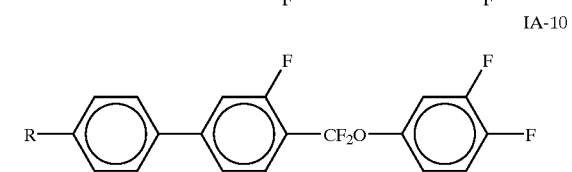

IA-11

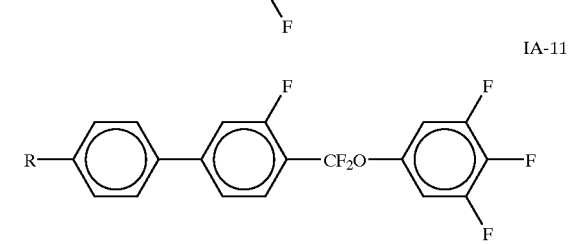

In which R is as defined in the formula IA.

Of these preferred compounds, particular preference is given to those of the formulae IA-1, IA-2, IA-3, IA-4, IA-9 and IA-10, in particular of the formulae IA-1 and IA-2.

Preferred embodiments of the mixtures according to the invention are indicated below:

Medium additionally comprises one or more compounds selected from the group consisting of the general formulae II to VI:

II

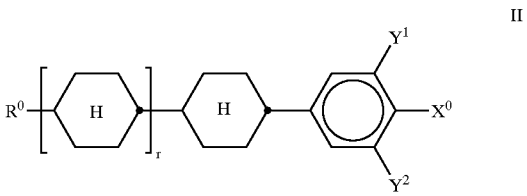

-continued

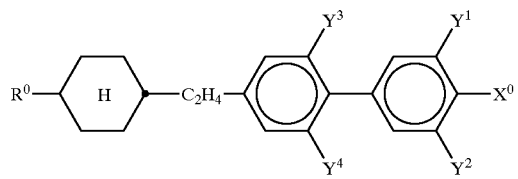
III

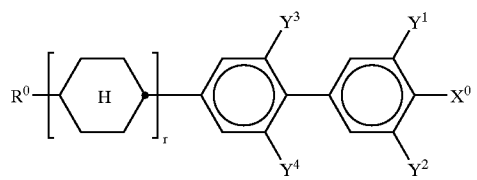
IV

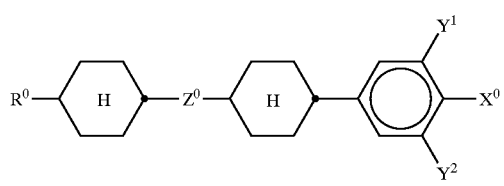
V

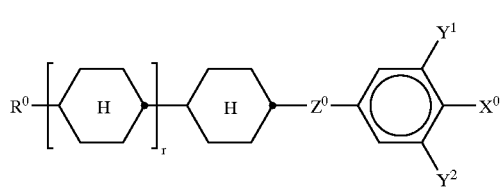
VI in which the individual radicals have the following meanings:

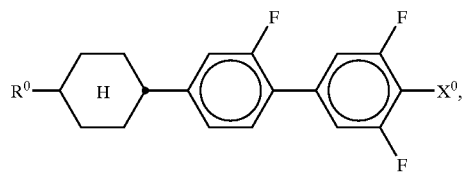
IVa

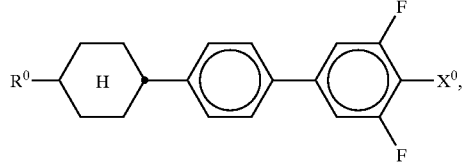
IVb

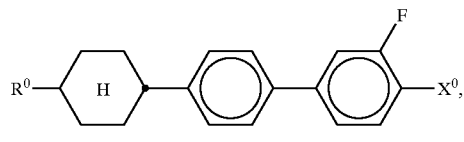
IVc

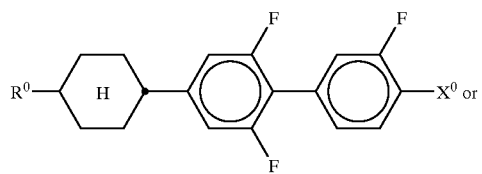
IVd

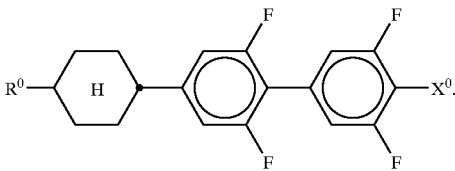
IVe

If $X^0$ is a halogenated alkyl, alkenyl or alkoxy, the halogen substituents are preferably F or Cl, especially F.

The compound of the formula IV is preferably

| | |
|---|---|
| $R^0$ | n-alkyl, oxaalkyl, fluoroalkyl, alkenyl or alkenyloxy, in each case having up to 9 carbon atoms, |
| $X^0$ | F, Cl, halogenated alkyl, alkenyl or alkoxy having up to 6 carbon atoms, |
| $Z^0$ | $-C_2F_4-$, $-C_2H_4-$, $-(CH_2)_4-$, $-CH=CF-$, $-CF=CF-$, $-OCH_2-$ or $-CH_2O-$, |
| $Y^1$ and $Y^2$ | each, independently of one another, H or F, |
| r | 0 or 1. |

Medium additionally comprises one or more compounds selected from the group consisting of the general formulae VII to XII:

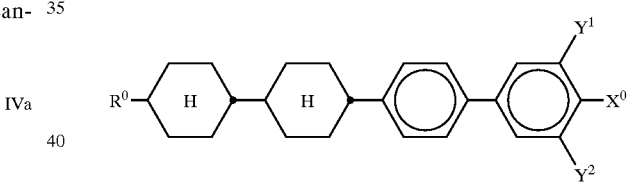
VII

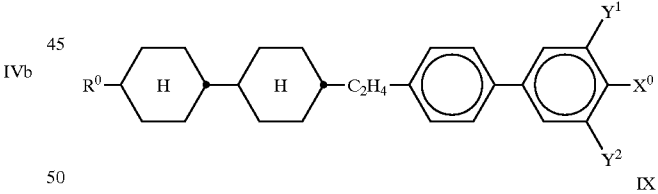
VIII

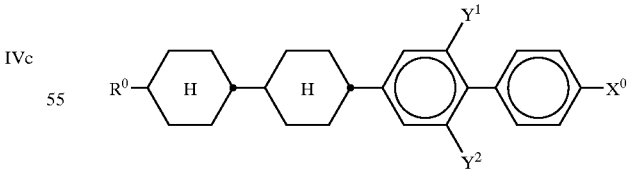
IX

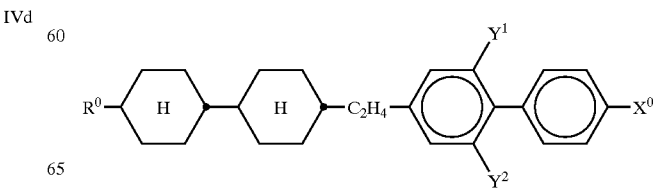
X

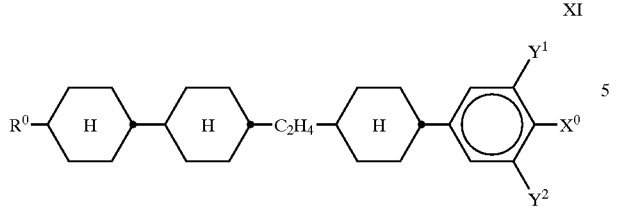

XI

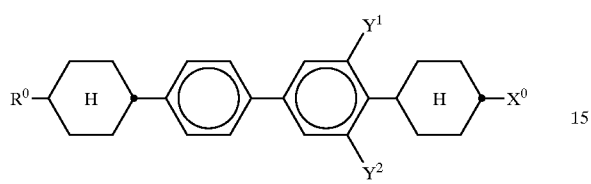

XII in which $R^0$, $X^0$, $Y^1$ and $Y^2$ are each, independently of one another, as defined in formulas II–VI. $X^0$ is preferably F, Cl, $CF_3$, $OCF_3$, or $OCHF_2$. $R^0$ is preferably alkyl, oxaalkyl, fluoroalkyl or alkenyl, each having up to 6 carbon atoms.

Medium additionally comprises one or more compounds of the formula XIII

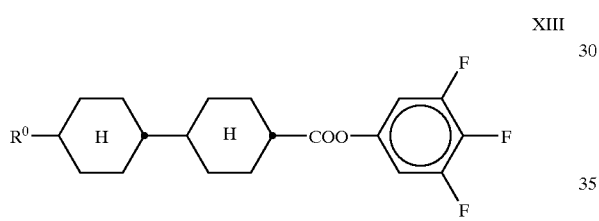

XIII in which $R^0$ is as defined in formulas II–VI;

- The proportion of compounds of the formula XIII is preferably 10–30% by weight, in particular 15–25% by weight;
- The proportion of compounds of the formulae IA and I to VI together in the mixture as a whole is at least 50% by weight;
- The proportion of compounds of the formula I in the mixture as a whole is from 2 to 30% by weight, particularly preferably from 2 to 20% by weight;
- The proportion of compounds of the formula IA in the mixture as a whole is from 10 to 50% by weight, particularly preferably from 15 to 40% by weight;
- The proportion of compounds of the formulae I, IA and II to VI in the mixture as a whole is from 30 to 80% by weight;

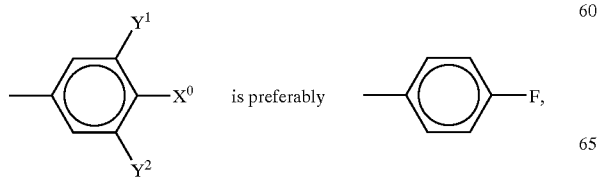

is preferably

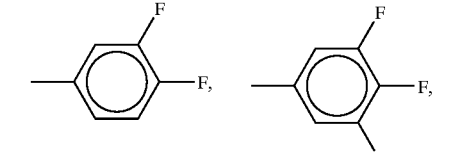
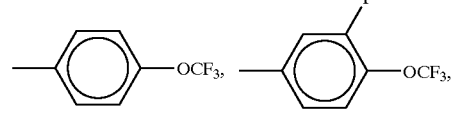
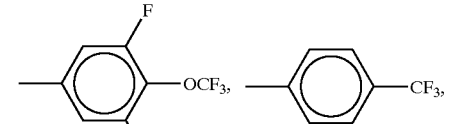
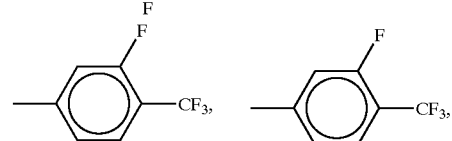
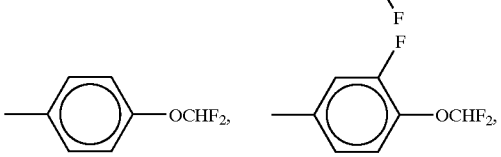
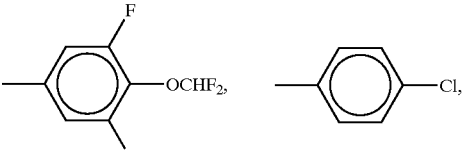
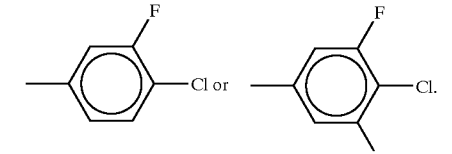

- The medium comprises compounds of the formulae II, III, IV, V or VI;
- $R^0$ is straight-chain alkyl or alkenyl having from 2 to 7 carbon atoms;
- The medium consists essentially of compounds of the formulae I, IA, II to VI and XIII;
- The medium further comprises compounds, preferably selected from the following group consisting of the general formulae XIV to XVII:

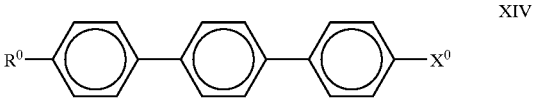

XIV

XV

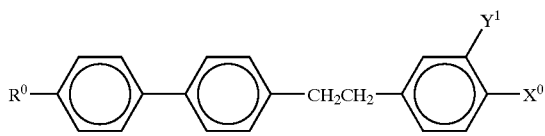

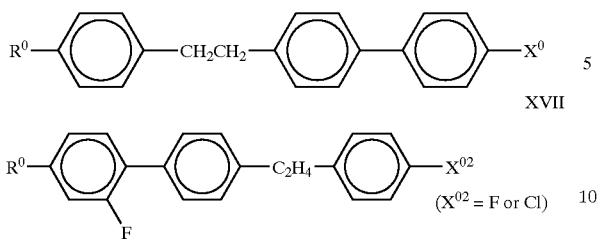

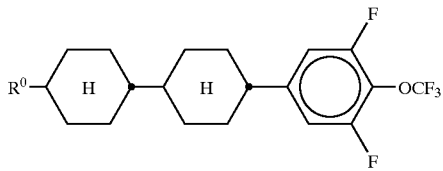

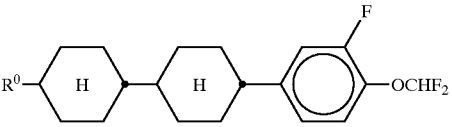

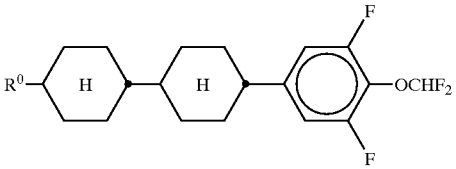

in which $R^0$, $Y^1$ and $X^0$ are as defined above.

The medium additionally comprises one, two, three or more, preferably two or three, compounds of the formula O1 and/or O2

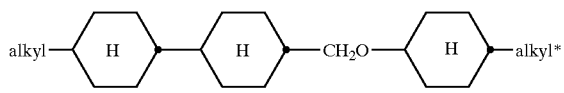

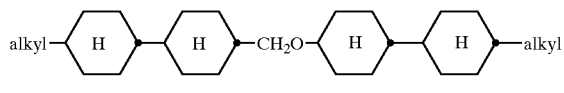

in which "alkyl" and "alkyl*" are as defined below.

The proportion of the compounds of formulae O1 and/or O2 in the mixtures according to the invention is preferably 5–20% by weight, in particular 5–15% by weight.

The medium preferably comprises 5–35% by weight of the compound IVa.

The medium comprises one or more compounds of the formula IVa in which $X^0$ is F or $OCF_3$.

The medium preferably comprises one or more compounds of the formulae IIa to IIg,

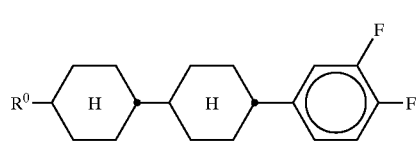

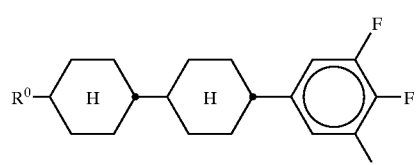

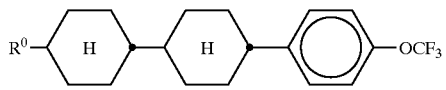

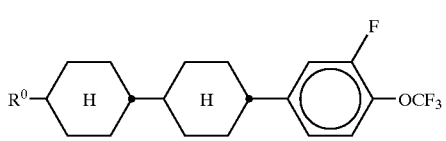

in which $R^0$ is as defined above. In the compounds of the formulae IIa–IIg, $R^0$ is preferably ethyl, n-propyl, n-butyl or n-pentyl.

The (I+IA): (II +III+IV+V+VI) weight ratio is preferably from 1:10 to 10:1.

Medium consists essentially of compounds selected from the group consisting of the general formulae IA and I to XIII.

The proportion of the compounds of the formulae IVb and/or IVc in which $X^0$ is fluorine and $R^0$ is $C_2H_5$, n-$C_3H_7$, n-$C_4H_9$ or n-$C_5H_{11}$ in the mixture as a whole is from 2 to 20% by weight, in particular from 2 to 15% by weight;

The medium preferably comprises one, two, three or more, preferably two or three, alkenyl compounds of the formula XVIII

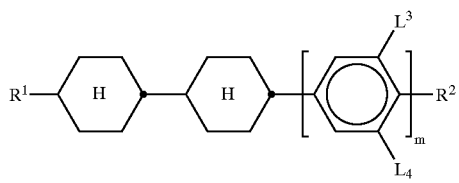

in which
$R^1$ is an alkenyl radical having from 2 to 7 carbon atoms,
$R^2$ is a halogenated or unsubstituted alkyl radical having up to 12 carbon atoms, where one or more $CH_2$ groups in these radicals may also be replaced, in each case independently of one another, by —CH=CH—, —C≡C—, —O—, —CO—O— or —O—CO— in such a way that O atoms are not linked directly to one another, or, if m=1, $R^2$ is alternatively Q—Y,
Q is $CF_2$, $OCF_2$, CFH, OCFH or a single bond,
Y is F or Cl,
$L^3$ and $L^4$ are each, independently of one another, H or F, and
m is 0 or 1.
If $R^2$ is a halogenated alkyl radical, the halogen substituents are preferably F or Cl, especially F.
The compounds of formula XVIII are preferably of subformulas XVIII-1 to XVIII-3:

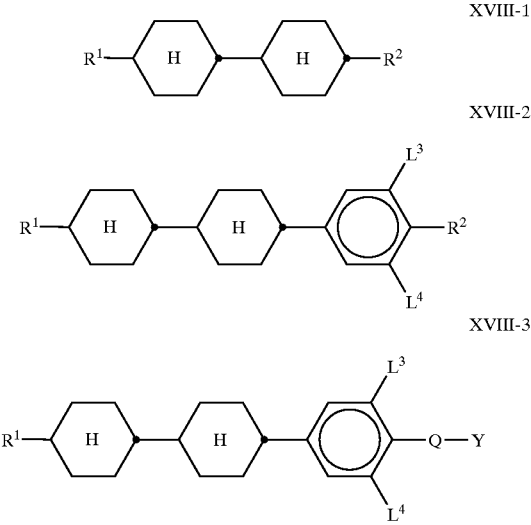

in which $R^1$, $R^2$, $L^3$, $L^4$, Q and Y are as defined in the formula XVIII.

Particular preference is given to media according to the invention which comprise at least one compound of the formula XVIII-1 and/or XVIII-3, particularly preferably in each case at least one compound of the formula XVIII-1.

In the formulae XVIII-1, XVIII-2 and XVIII-3, $R^1$ is particularly preferably 1E-alkenyl or 3E-alkenyl having from 2 to 7 carbon atoms.

Particularly preferred compounds of the formula XVIII-1 are those in which $R^2$ is alkenyl having from 2 to 7 carbon atoms, in particular those of the following formulae:

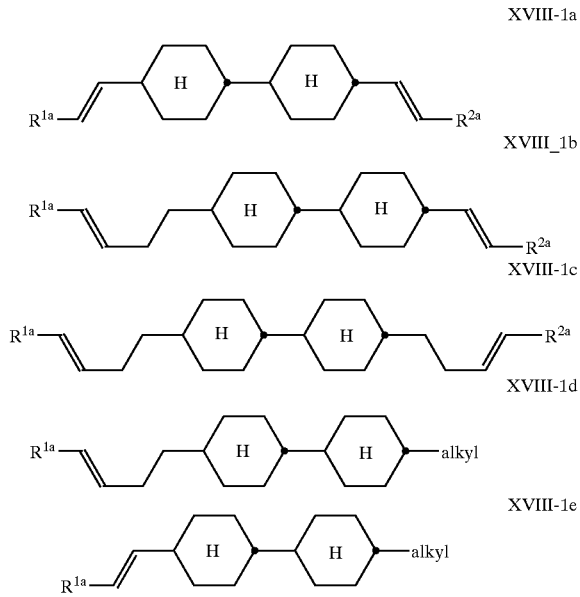

in which $R^{1a}$ and $R^{2a}$ are each, independently of one another, H, $CH_3$, $C_2H_5$ or n-$C_3H_7$, and alkyl is a straight-chain alkyl group having from 1 to 7 carbon atoms.

Particular preference is given to media according to the invention which comprise at least one compound of the formula XVIII-1a and/or XVIII-1c in which $R^{1a}$ and $R^{2a}$ each have the same meaning, and to media which comprise at least one compound of the formula XVIII-1e.

In a further preferred embodiment, the media according to the invention comprise one or more compounds of the formula XVIII-2. Particularly preferred compounds of the formula XVIII-2 are those in which $L^3$ and $L^4$ are H, and also those in which $R^2$ is alkyl having from 1 to 8, in particular 1, 2 or 3, carbon atoms, and $R^1$ is 1E-alkenyl or 3E-alkenyl having from 2 to 7, in particular 2, 3 or 4, carbon atoms.

Particularly preferred compounds of the formula XVIII-3 are those in which $L^3$ and/or $L^4$ are F, and Q—Y is F or $OCF_3$. Preference is furthermore given to compounds of the formula XVIII-3 in which $R^1$ is 1E-alkenyl or 3E-alkenyl having from 2 to 7 carbon atoms, in particular 2, 3 or 4 carbon atoms.

It has been found that even a relatively small proportion of compounds of the formulae I and IA mixed with conventional liquid-crystal materials, but in particular with one or more compounds of the formulae II, III, IV, V and/or VI, results in a significant lowering of the threshold voltage and in low birefringence values, with broad nematic phases with low smectic-nematic transition temperatures being observed at the same time, improving the shelf life. Particular preference is given to mixtures which, besides one or more compounds of the formulae I and IA, comprise one or more compounds of the formula IV, in particular compounds of the formula IVa in which $X^0$ is F or $OCF_3$.

The compounds of the formulae I to VI are colorless, stable and readily miscible with one another and with other liquid-crystalline materials.

The term "alkyl" or "alkyl*" covers straight-chain and branched alkyl groups having 1–7 carbon atoms, in particular the straight-chain groups methyl, ethyl, propyl, butyl, pentyl, hexyl and heptyl. Groups having 2–5 carbon atoms are generally preferred.

The term "alkenyl" covers straight-chain and branched alkenyl groups having 2–7 carbon atoms, in particular the straight-chain groups. Preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluoro-butyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. n is preferably =1 and m is preferably from 1 to 6.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio of the elastic constants $k_{33}$ (bend) and $k_{11}$ (splay) compared with alkyl or alkoxy radicals. 4-alkenyl radicals, 3-alkenyl radicals and the like generally give lower threshold voltages and smaller values of $k_{33}/k_{11}$ compared with alkyl and alkoxy radicals.

A —$CH_2CH_2$— group generally results in higher values of $k_{33}/k_{11}$ compared with a single covalent bond. Higher values of $k_{33}/k_{11}$ facilitate, for example, flatter transmission characteristic lines in TN cells with a 90° twist (in order to achieve grey shades) and steeper transmission characteristic lines in STN, SBE and OMI cells (greater multiplexability), and vice versa.

The optimum mixing ratio of the compounds of the formulae I, IA and II+III+IV+V+VI depends substantially on the desired properties, on the choice of the components of the formulae I, IA, II, III, IV, V and/or VI, and the choice of any other components that may be present. Suitable mixing ratios within the range given above can easily be determined from case to case.

The total amount of compounds of the formulae I, IA and II to XIII in the mixtures according to the invention is not crucial. The mixtures can therefore comprise one or more further components for the purposes of optimizing various properties. However, the observed effect on the addressing times and the threshold voltage is generally greater, the higher the total concentration of compounds of the formulae I, IA and II to XIII.

In a particularly preferred embodiment, the media according to the invention comprise compounds of the formulae II to VI (preferably II, III and/or IV, in particular IVa)in which $X^0$ is F, $OCF_3$, $OCHF_2$, F, $OCH=CF_2$, $OCF=CF_2$ or $OCF_2$—$CF_2H$. A favorable synergistic effect with the compounds of the formulae I and IA results in particularly advantageous properties. In particular, mixtures comprising compounds of the formula IA and of the formula IVa are distinguished by their low threshold voltages.

The individual compounds of the formulae I, IA and II to XVII and their sub-formulae which can be used in the media according to the invention are either known or can be prepared analogously to known compounds.

The construction of the MLC display according to the invention from polarizers, electrode base plates and surface-treated electrodes corresponds to the conventional construction for displays of this type. The term "conventional construction" is broadly drawn here and also covers all derivatives and modifications of the MLC display, in particular including matrix display elements based on poly-Si TFT or MIM.

A significant difference between the displays according to the invention and the conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in the lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature. For example, 0–15% of pleochroic dyes or chiral dopants can be added.

C denotes a crystalline phase, S a smectic phase, $S_C$ a smectic C phase, N a nematic phase and I the isotropic phase.

$V_{10}$ denotes the voltage for 10% transmission (viewing angle perpendicular to the plate surface). $t_{on}$ denotes the switch-on time and $t_{off}$ the switch-off time at an operating voltage corresponding to 2 times the value of $V_{10}$. $\Delta n$ denotes the optical anisotropy and n the refractive index. $\Delta \epsilon$ denotes the dielectric anisotropy ($\Delta \epsilon = \epsilon_\parallel - \epsilon_\perp$, where $\epsilon_\parallel$ denotes the dielectric constant parallel to the longitudinal molecular axes and $\epsilon_\perp$ denotes the dielectric constant perpendicular thereto). The electro-optical data were measured in a TN cell at the 1st minimum (i.e. at a d·$\Delta n$ value of 0.5) at 20° C., unless expressly stated otherwise. The optical data were measured at 20° C., unless expressly stated otherwise.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively; n and m are integers and are preferably 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$, $L^{2*}$ and $L^{3*}$.

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ | $L^{3*}$ |
|---|---|---|---|---|---|
| nm | $C_nH_{2n+1}$ | $C_mH_{2m+1}$ | H | H | H |
| nOm | $OC_nH_{2n+1}$ | $C_mH_{2m+1}$ | H | H | H |
| nO.m | $C_nH_{2n+1}$ | $OC_mH_{2m+1}$ | H | H | H |
| n | $C_nH_{2n+1}$ | CN | H | H | H |
| nN.F | $C_nH_{2n+1}$ | CN | H | H | F |
| nN.F.F | $C_nH_{2n+1}$ | CN | H | F | F |
| nF | $C_nH_{2n+1}$ | F | H | H | H |
| nOF | $OC_nH_{2n+1}$ | F | H | H | H |
| nF.F | $C_nH_{2n+1}$ | F | H | H | F |
| nmF | $C_nH_{2n+1}$ | $C_mH_{2m+1}$ | F | H | H |
| nOCF$_3$ | $C_nH_{2n+1}$ | OCF$_3$ | H | H | H |
| nOCF$_3$.F | $C_nH_{2n+1}$ | OCF$_3$ | F | H | H |
| n-Vm | $C_nH_{2n+1}$ | —CH=CH—$C_mH_{2m+1}$ | H | H | H |
| nV-Vm | $C_nH_{2n+1}$—CH=CH— | —CH=CH—$C_mH_{2m+1}$ | H | H | H |

Preferred mixture components are given in Tables A and B.

TABLE A

PYP

PYRP

BCH

CBC

CCH

CCP

CPTP

CEPTP

TABLE A-continued

ECCP

CECP

EPCH

PCH

PTP

BECH

EBCH

CPC

TABLE A-continued
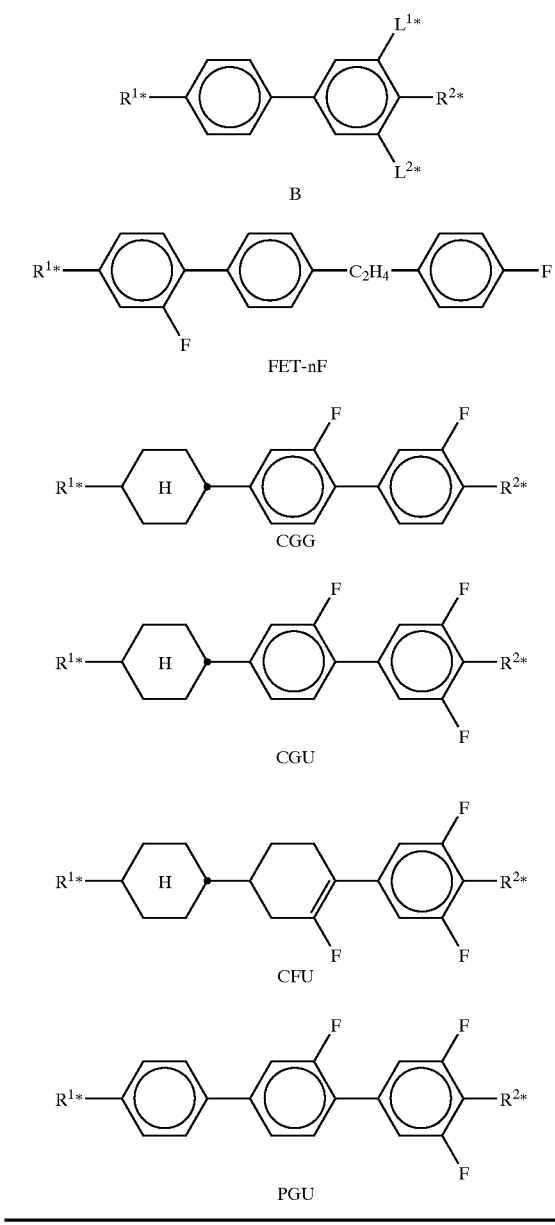
TABLE B
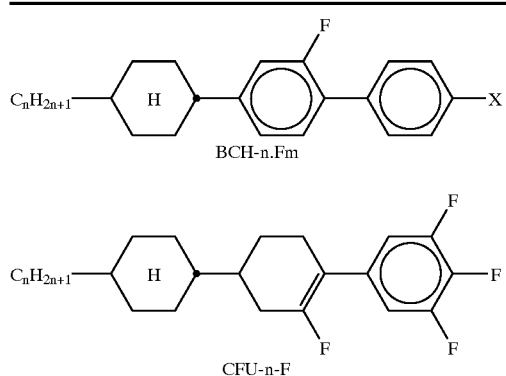
TABLE B-continued
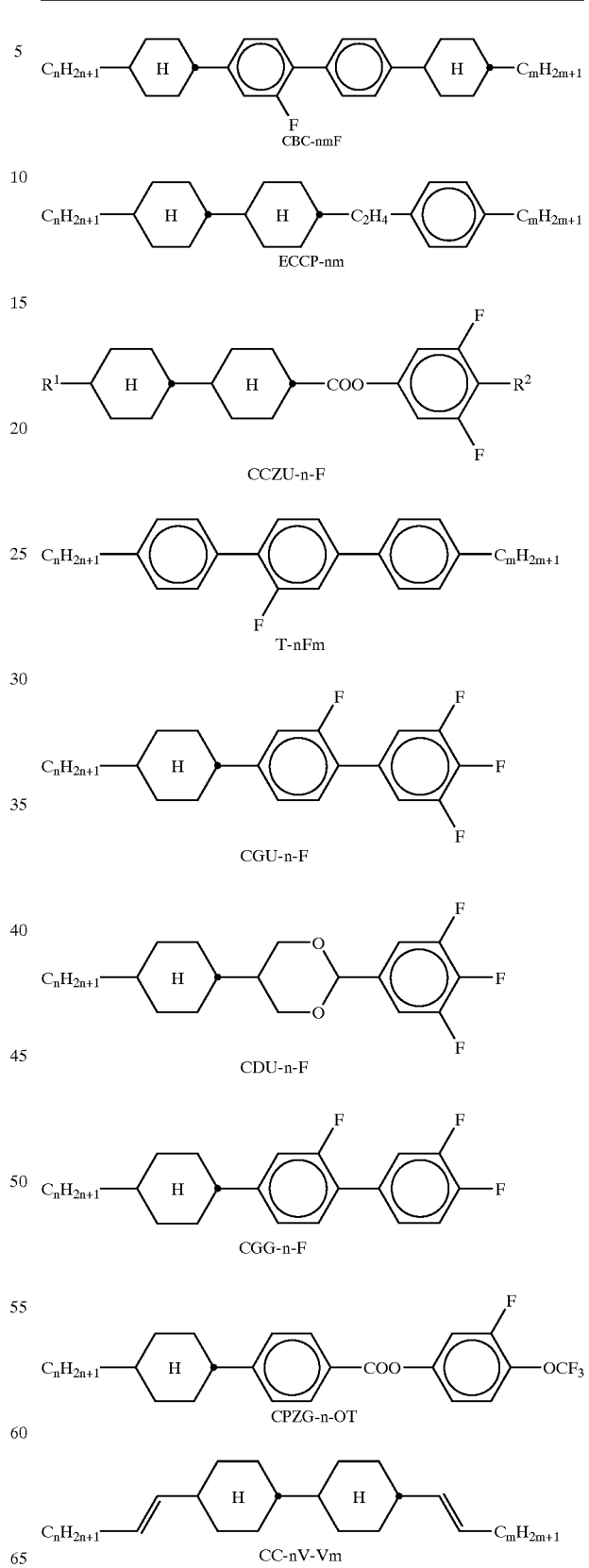

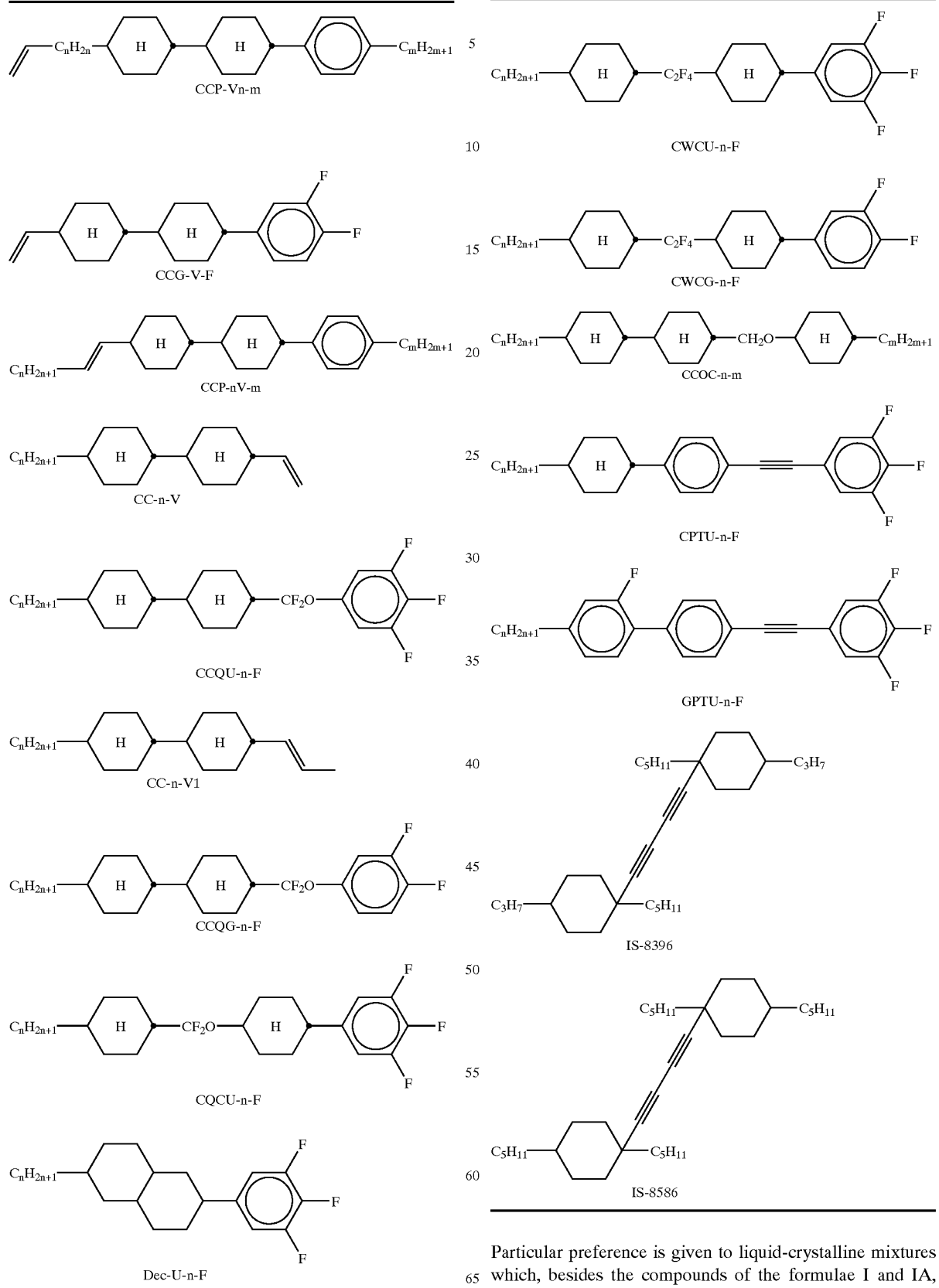
Particular preference is given to liquid-crystalline mixtures which, besides the compounds of the formulae I and IA, comprise at least one, two, three or four compounds from Table B.

TABLE C
Table C shows possible dopants which are usually added to the compounds according to the invention.
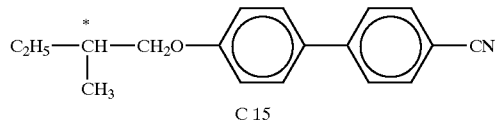
C 15
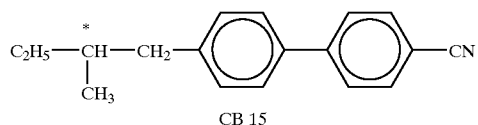
CB 15
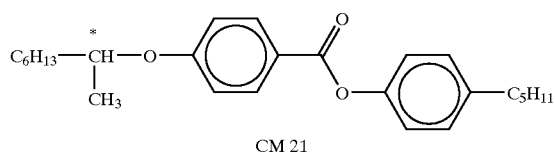
CM 21
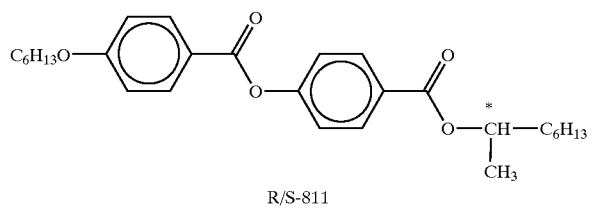
R/S-811
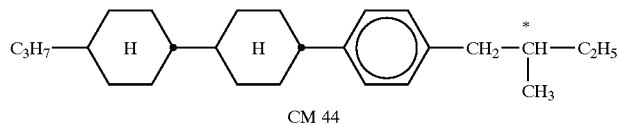
CM 44
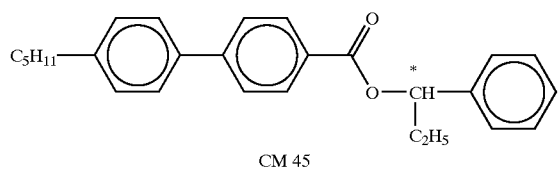
CM 45
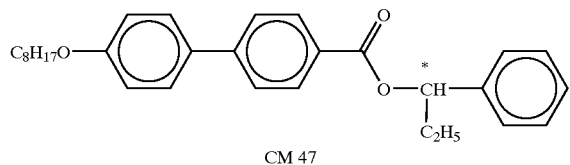
CM 47
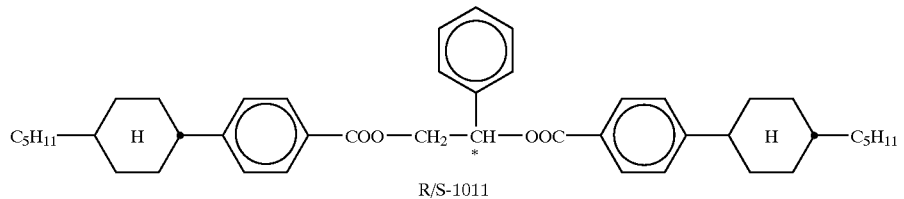
R/S-1011

TABLE C-continued

Table C shows possible dopants which are usually added to the compounds according to the invention.

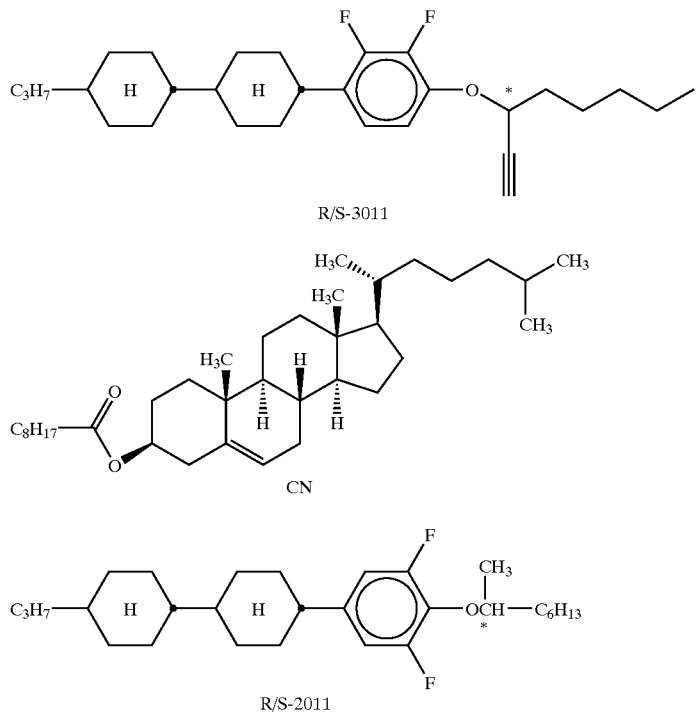

The entire disclosure of all applications, patents and publications, cited above and below, and of corresponding German application No. DE 100 51 995 4, filed Oct. 20, 2000.

EXAMPLES

The following examples are intended to explain the invention without restricting it. Above and below, percentages are per cent by weight. All temperatures are given in degrees Celsius. m.p. denotes melting point, cl.p.=clearing point. Furthermore, C=crystalline state, N=nematic phase, S=smectic phase and I=isotropic phase. The data between these symbols represent the transition temperatures. $\Delta n$ denotes optical anisotropy (589 nm, 20° C.), and the flow viscosity $v_{20}$ (mm²/sec) and the rotational viscosity $\gamma_1$ [mPa·s] were each determined at 20° C.

Example 1

| | | | |
|---|---|---|---|
| CCH-301 | 9.00% | S → N [° C.]: | −40.0 |
| CCP-2F.F.F | 8.00% | Clearing point [° C.]: | +86.5 |
| CCZU-2-F | 4.00% | Δn [589 nm; 20° C.]: | +0.0594 |
| CCZU-3-F | 14.00% | d · Δn [μm, 20° C.]: | 0.50 |
| CCZU-5-F | 4.00% | Twist [°]: | 90 |
| CGU-2-F | 6.00% | $V_{10}$ [V]: | 1.51 |
| CCOC-3-3 | 3.00% | Voltage holding ratio (20° C.): | 99.0% |
| CCOC-3-5 | 2.00% | | |
| CCOC-4-3 | 4.00% | | |
| CCPC-34 | 2.00% | | |
| CCPC-35 | 3.00% | | |
| IS-8396 | 5.00% | | |
| IS-8586 | 6.00% | | |
| CCQU-2-F | 10.00% | | |

-continued

| | |
|---|---|
| CCQU-3-F | 12.00% |
| CCQU-5-F | 8.00% |

Example 2

| | | | |
|---|---|---|---|
| CCH-501 | 5.00% | S → N [° C.]: | <−40.0 |
| CCP-2F.F.F | 8.00% | Clearing point [° C.]: | +81.0 |
| CCP-2F.F.F | 10.00% | Δn [589 nm; 20° C.]: | +0.0600 |
| CCZU-2-F | 4.00% | Δε [1 kHz; 20° C.]: | 12.7 |
| CCZU-3-F | 14.00% | d · Δn [μm, 20° C.]: | 0.50 |
| CCZU-5-F | 4.00% | Twist [°]: | 90 |
| CGU-2-F | 5.00% | $V_{10}$ [V]: | 1.38 |
| CCOC-3-3 | 3.00% | Voltage holding ratio (20° C.): | 98.8% |
| CCOC-3-5 | 3.00% | | |
| CCOC-4-3 | 4.00% | | |
| IS-8396 | 5.00% | | |
| IS-8586 | 5.00% | | |
| CCQU-2-F | 10.00% | | |
| CCQU-3-F | 12.00% | | |
| CCQU-5-F | 8.00% | | |

The preceding examples be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium based on a mixture of polar compounds of positive dielectric anisotropy, comprising one or more compounds of the formula I

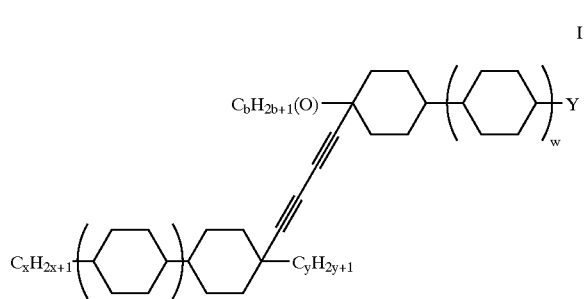

I and one or more compounds of formula IA

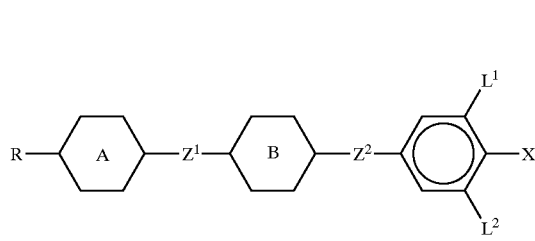

IA wherein

| | |
|---|---|
| a, b, x and y | are each, independently of one another, 0 to 10, |
| v and w | are each, independently of one another, 0 or 1, |
| R | is a halogenated or unsubstituted alkyl radical having up to 12 carbon atoms, where one or more CH$_2$ groups in these radicals may also be replaced, in each case independently of one another, by —CH=CH—, —C≡C—, —O—, —CO—O— or —O—CO— in such a way that O atoms are not linked directly to one another, |
| X | is F, Cl, CN, SF$_5$, a halogenated alkyl radical having up to 6 carbon atoms, a halogenated alkenyl radical having up to 6 carbon atoms, a halogenated alkoxy radical having up to 6 carbon atoms or a halogenated alkenyloxy radical having up to 6 carbon atoms, |
| Y | is C$_a$H$_{2a+1}$, CF$_3$, OCF$_3$, OCHF$_2$, OCF$_2$CHFCF$_3$, SF$_5$, F or Cl, |
| Z$^1$ and Z$^2$ | are each, independently of one another, —CF$_2$O— or a single bond, where Z$^1$ ≠ Z$^2$, |

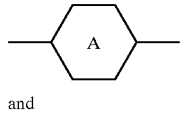

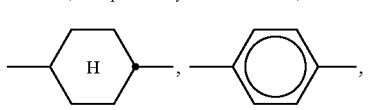

are each, independently of one another, and

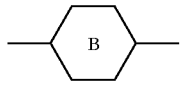

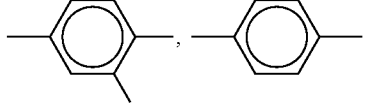

 or

-continued

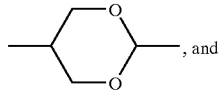, and

L$^1$ and L$^2$ are each, independently of one another, H or F.

2. A medium according to claim 1, further comprising one or more compounds of formulae IA1–IA11:

IA-1

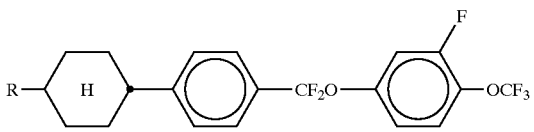

IA-2

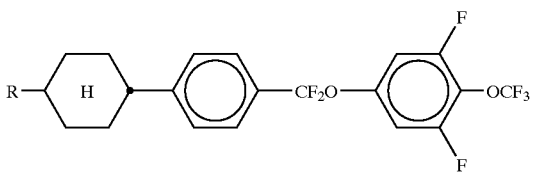

IA-3

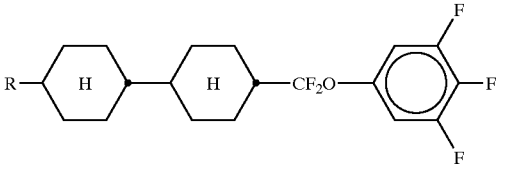

IA-4

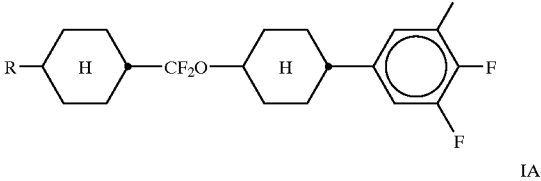

IA-5

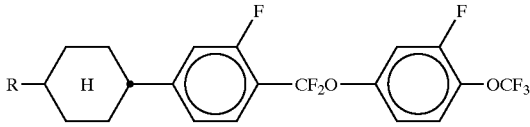

IA-6

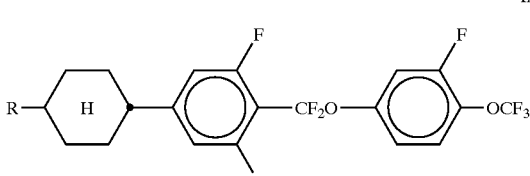

IA-7

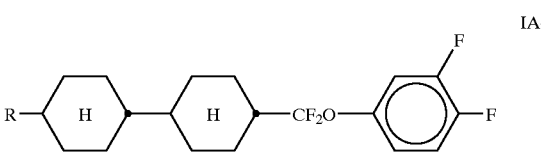

-continued

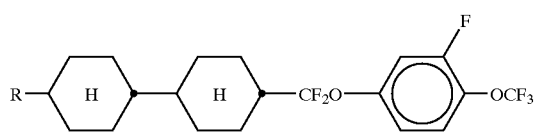
IA-8

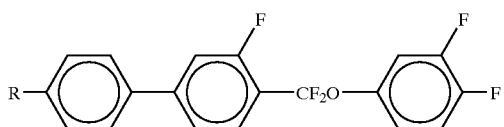
IA-9

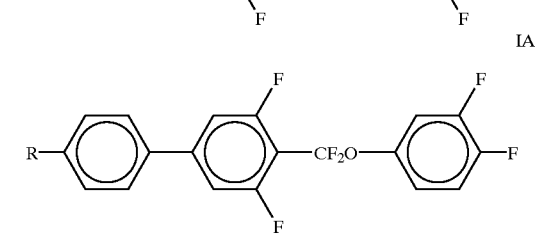
IA-10

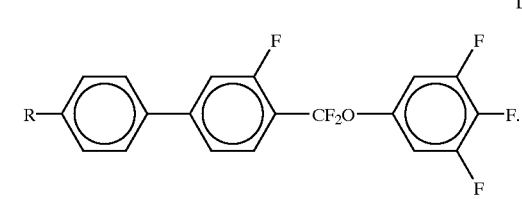
IA-11

3. A medium according to claim 1, further comprising one or more compounds selected from formulae II, III, IV, V and VI:

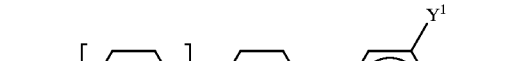
II

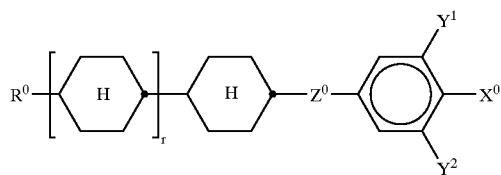
VI wherein
$R^0$ is, in each case independently, n-alkyl, oxaalkyl, fluoroalkyl, alkenyl or alkenyloxy, each having up to 9 carbon atoms,
$X^0$ is, in each case independently, F, Cl, or halogenated alkyl, alkenyl or halogenated alkoxy each having up to 6 carbon atoms,
$Z^0$ is, in each case independently, —$C_2F_4$—, —$C_2H_4$—, —$(CH_2)_4$—, —CH=CF—, —CF=CF—, —$OCH_2$— or —$CH_2O$—,
$Y^1$ and $Y^2$ are each, independently of one another, H or F, and
r is 0 or 1.

4. A medium according to claim 2, further comprising one or more compounds selected from formulae II, III, IV, V and VI:

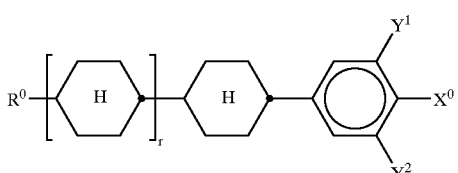
II

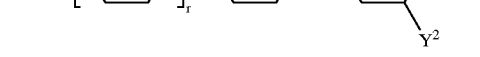

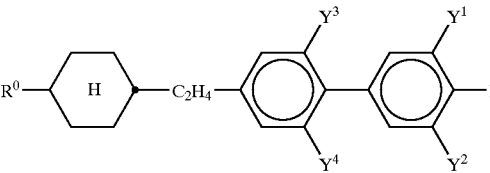
III

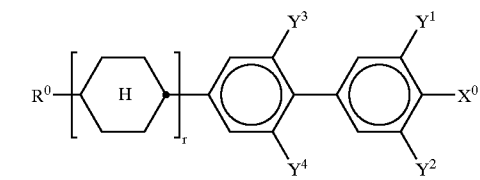
IV

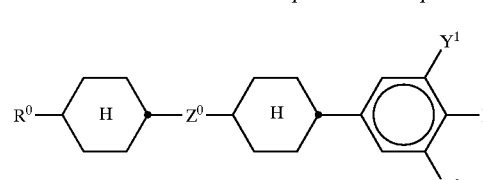
V

VI wherein $R^0$ is, in each case independently, n-alkyl, oxaalkyl, fluoroalkyl, alkenyl or alkenyloxy, each having up to 9 carbon atoms, $X^0$ is, in each case independently, F, Cl, or halogenated alkyl, alkenyl or halogenated alkoxy each having up to 6 carbon atoms, $Z^0$ is, in each case independently, $-C_2F_4-$, $-C_2H_4-$, $-(CH_2)_4-$, $-CH=CF-$, $-CF=CF-$, $-OCH_2-$ or $-CH_2O-$, $Y^1$ and $Y^2$ are each, independently of one another, H or F, and r is 0 or 1.

5. A medium according to claim 3, wherein the proportion of compounds of formulae IA and I to VI together in the mixture as a whole is at least 50% by weight.

6. A medium according to claim 4, wherein the proportion of compounds of formulae IA and I to VI together in the mixture as a whole is at least 50% by weight.

7. A medium according to claim 1, further comprising one or more compounds of formula XIII

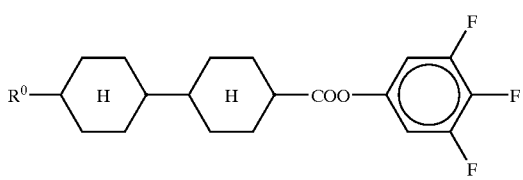

XIII wherein $R^0$ is n-alkyl, oxaalkyl, fluoroalkyl, alkenyl or alkenyloxy, each having up to 9 carbon atoms.

8. A medium according to claim 1, further comprising one or more compounds of formulae IIa to IIg:

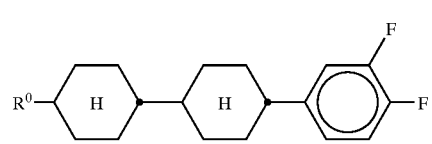

IIa

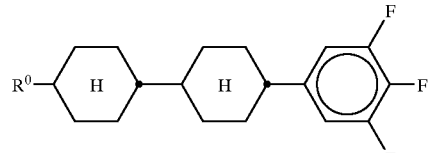

IIb

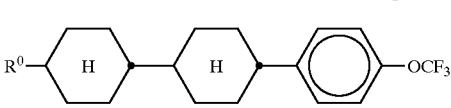

IIc

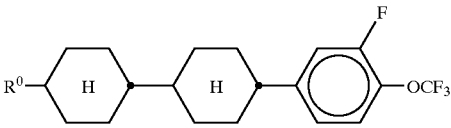

IId

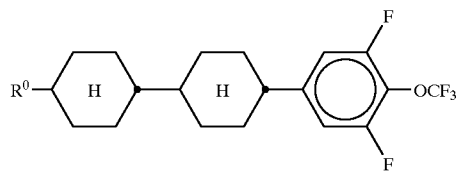

IIe

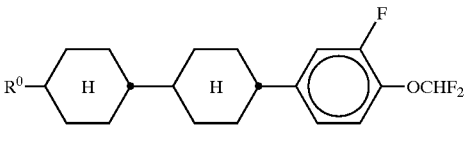

IIf

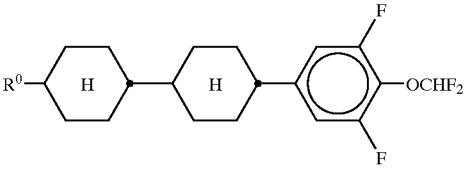

IIg wherein $R^0$ is, in each case independently, n-alkyl, oxaalkyl, fluoroalkyl, alkenyl or alkenyloxy, each having up to 9 carbon atoms.

9. A medium according to claim 1, further comprising one or more compounds of formulae XVIII-1a to XVIII-1e

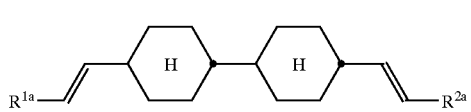

XVIII-1a

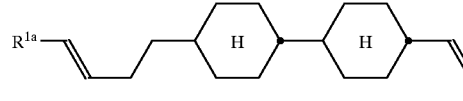

XVIII-1b

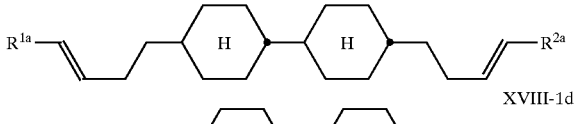

XVIII-1c

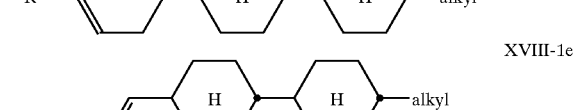

XVIII-1d

XVIII-1e in which $R^{1a}$ and $R^{2a}$ are each, independently of one another, H, $CH_3$, $C_2H_5$ or $n-C_3H_7$, and alkyl is an alkyl group having from 1 to 7 carbon atoms.

10. A medium according to claim 1, wherein the proportion of compounds of formulae IA in the mixture as a whole is 10–50% by weight.

11. In an electro-optical liquid-crystal display containing a liquid-crystalline medium, the improvement wherein said medium is in accordance with claim 1.

12. In a method of generating an electro-optical effect using an electro-optical liquid-crystal display, the improvement wherein said display is in accordance with claim 11.

13. A liquid crystal mixture according to claim 1, wherein said mixture has a nematic phase down to −30° C. and a clearing point above 80° C.

14. A liquid crystal mixture according to claim 1, wherein said mixture has a Δε of ≥6.

15. A liquid crystal mixture according to claim 1, wherein said mixture has a Δε of ≥8.

16. A liquid crystal mixture according to claim 1, wherein said mixture has a TN threshold of below 1.6 V.

17. A liquid crystal mixture according to claim 1, wherein said mixture has a TN threshold of less than 1.4 V.

18. A liquid crystal mixture according to claim 1, wherein said mixture has a flow viscosity at 20° C. of less than 60 mm²·s⁻¹.

19. A liquid crystal mixture according to claim 1, wherein said mixture has a rotational viscosity at 20° C. of less than 250 mPa·s.

20. A liquid crystal mixture according to claim 1, wherein said mixture has a nematic phase range of at least 90 degrees.

21. A liquid-crystalline medium based on a mixture of polar compounds of positive dielectric anisotropy, comprising one or more compounds of the formula I

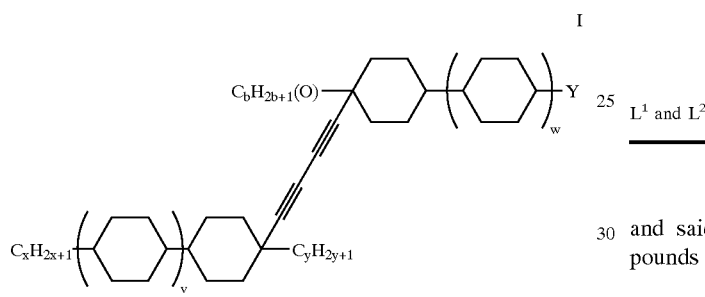

and one or more compounds of formula IA

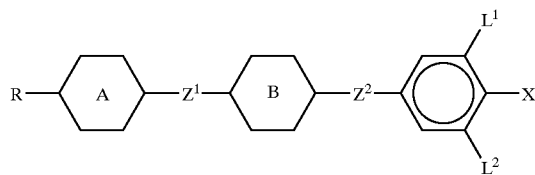

wherein

| | |
|---|---|
| a, b, x and y | are each, independently of one another, 0 to 10, |
| v and w | are each, independently of one another, 0 or 1, |
| R | is a halogenated or unsubstituted alkyl radical having up to 12 carbon atoms, where one or more CH₂ groups in these radicals may also be replaced, in each case independently of one another, by —CH=CH—, —C≡C—, —O—, —CO—O— or —O—CO— in such a way that O atoms are not linked directly to one another, |
| X | is F, Cl, CN, SF₅, a halogenated alkyl radical having up to 6 carbon atoms, a halogenated alkenyl radical having up to 6 carbon atoms, a halogenated alkoxy radical having up to 6 carbon atoms or a halogenated alkenyloxy radical having up to 6 carbon atoms, |
| Y | is C$_a$H$_{2a+1}$, CF₃, OCF₃, OCHF₂, OCF₂CHFCF₃, SF₅, F or Cl, |
| Z¹ and Z² | are each, independently of one another, —CF₂O— or a single bond, where Z¹ ≠ Z², |

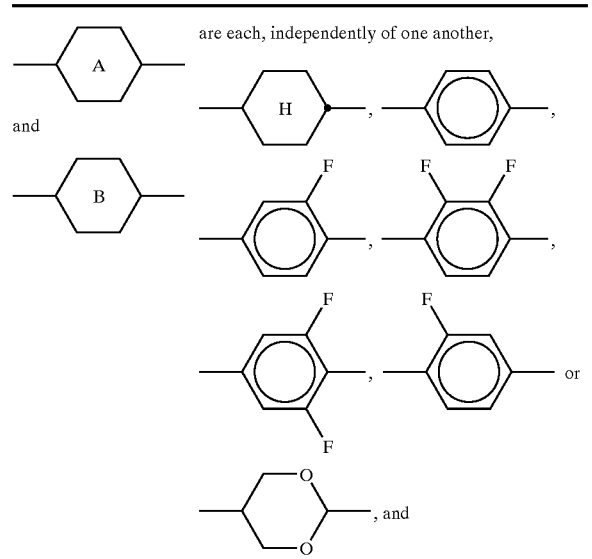

and said medium further comprising one or more compounds of formulae XVIII-1a to XVIII-1e in which R$^{1a}$ and R$^{2a}$ are each, independently of one another, H, CH₃, C₂H₅ or n-C₃H₇, and alkyl is an alkyl group having from 1 to 7 carbon atoms.

22. A liquid-crystalline medium based on a mixture of polar compounds of positive dielectric anisotropy, comprising one or more compounds of the formula I

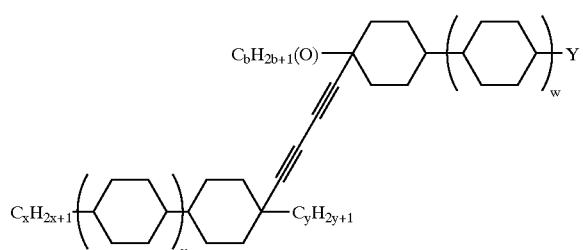

and one or more compounds of formula IA

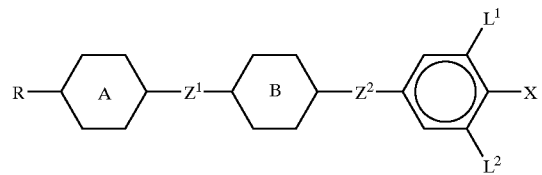

wherein

| | |
|---|---|
| a, b, x and y | are each, independently of one another, 0 to 10, |
| v and w | are each, independently of one another, 0 or 1, |
| R | is a halogenated or unsubstituted alkyl radical having up to 12 carbon atoms, where one or more $CH_2$ groups in these radicals may also be replaced, in each case independently of one another, by —CH=CH—, —C≡C—, —O—, —CO—O— or —O—CO— in such a way that O atoms are not linked directly to one another, |
| X | is F, Cl, CN, $SF_5$, a halogenated alkyl radical having up to 6 carbon atoms, a halogenated alkenyl radical having up to 6 carbon atoms, a halogenated alkoxy radical having up to 6 carbon atoms or a halogenated alkenyloxy radical having up to 6 carbon atoms, |
| Y | is $C_aH_{2a+1}$, $CF_3$, $OCF_3$, $OCHF_2$, $OCF_2CHFCF_3$, $SF_5$, F or Cl, |
| $Z^1$ and $Z^2$ | are each, independently of one another, —$CF_2O$— or a single bond, where $Z^1 \neq Z^2$, |

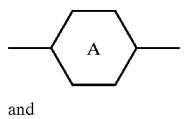

are each, independently of one another,

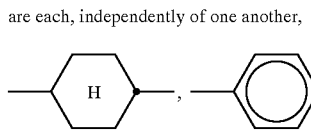

and

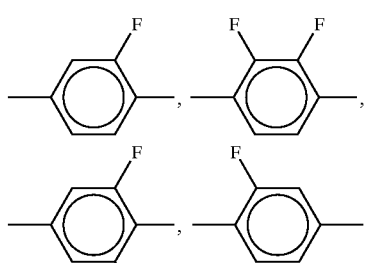

| | |
|---|---|
| $L^1$ and $L^2$ | are each, independently of one another, H or F; | wherein the proportion of compounds of formulae IA in the mixture as a whole is 10–50% by weight.

23. A liquid crystal mixture according to claim 1, wherein said one or more compound of Formula 1 are selected from formulae I1 to I6:

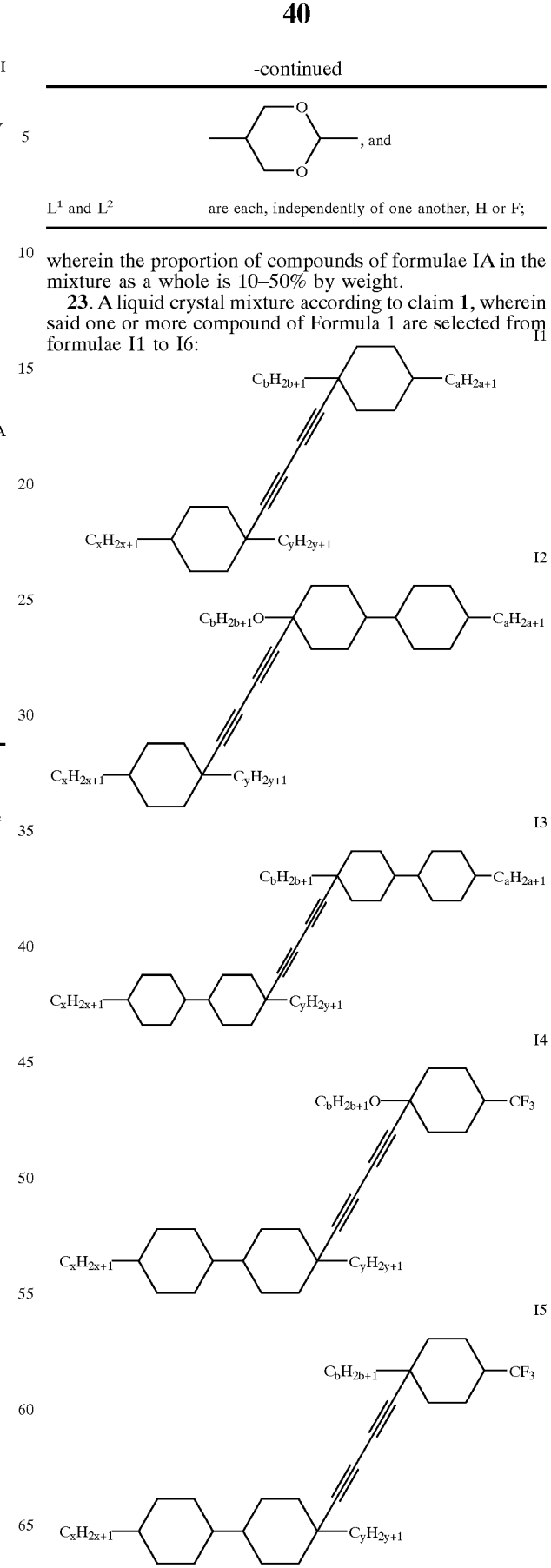

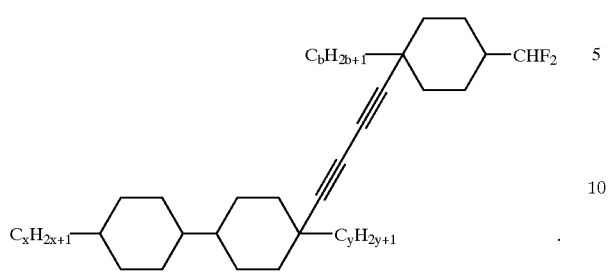

I6

24. A liquid crystal mixture according to claim 1, wherein the medium additionally comprises one or more compounds selected from formulae VII to XII:

VII

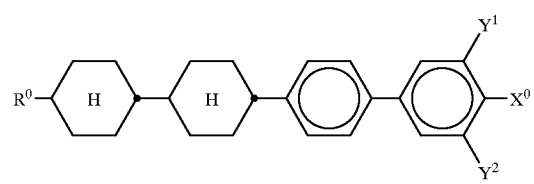

VIII

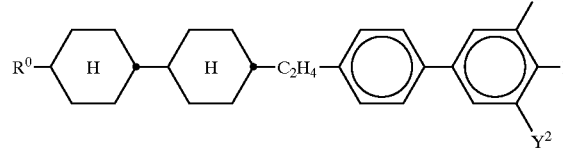

IX

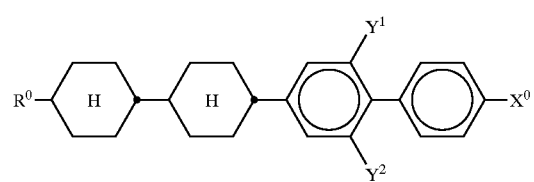

X

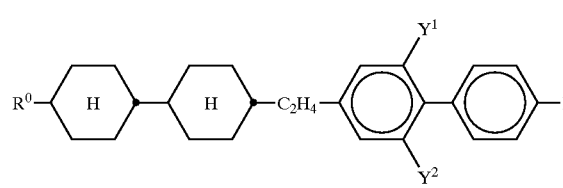

XI

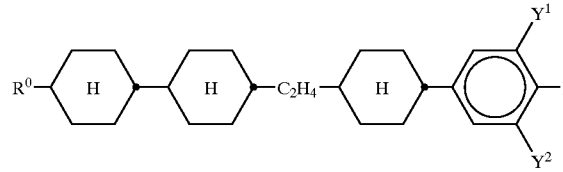

XII

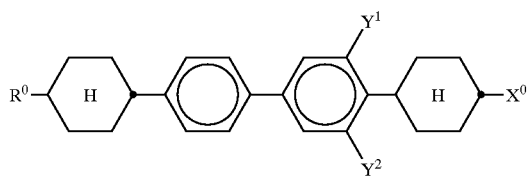

wherein $R^0$ is, in each case independently, n-alkyl, oxaalkyl, fluoroalkyl, alkenyl or alkenyloxy, each having up to 9 carbon atoms, $X^0$ is, in each case independently, F, Cl, or halogenated alkyl, alkenyl or halogenated alkoxy each having up to 6 carbon atoms, $Z^0$ is, in each case independently, —$C_2F_4$—, —$C_2H_4$—, —$(CH_2)_4$—, —CH=CF—, —CF=CF—, —$OCH_2$— or —$CH_2O$—, and $Y^1$ and $Y^2$ are each, independently of one another, H or F.

25. A liquid crystal mixture according to claim 1, wherein the medium additionally comprises one or more compounds of the formula XIII XIII

XIII in which $R^0$ is, in each case independently, n-alkyl, oxaalkyl, fluoroalkyl, alkenyl or alkenyloxy, each having up to 9 carbon atoms.

26. A liquid crystal mixture according to claim 25, wherein the proportion of compounds of formula XIII is 10–30% by weight.

27. A liquid crystal mixture according to claim 1, wherein the proportion of compounds of the formula IA is 10 to 40% by weight.

28. A liquid crystal mixture according to claim 1, wherein the proportion of compounds of the formula IA is 15 to 40% by weight.

29. A liquid crystal mixture according to claim 2, wherein the proportion of compounds of the formulae I, IA and II to VI is 30 to 80% by weight.

30. A liquid crystal mixture according to claim 1, wherein the medium additionally comprises one or more compounds selected from formulae XIV to XVII:

XIV

XV

-continued

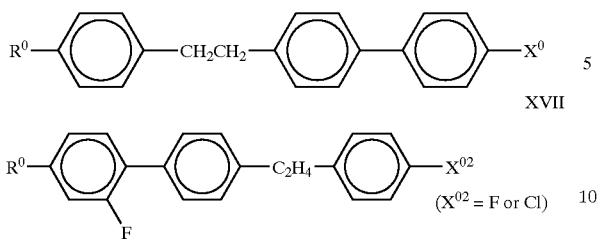

XVI

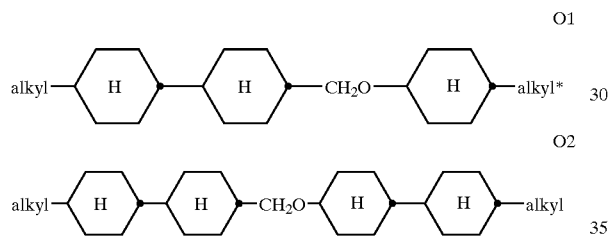

XVII ($X^{02}$ = F or Cl)

wherein $R^0$ is, in each case independently, n-alkyl, oxaalkyl, fluoroalkyl, alkenyl or alkenyloxy, each having up to 9 carbon atoms, $X^0$ is, in each case independently, F, Cl, or halogenated alkyl, alkenyl or halogenated alkoxy each having up to 6 carbon atoms, and $Y^1$ is H or F.

31. A liquid crystal mixture according to claim 1, wherein the medium additionally comprises one or more compounds selected from formulas O1 and O2

O1 alkyl—H—H—CH$_2$O—H—alkyl*

O2 alkyl—H—H—CH$_2$O—H—H—alkyl wherein "alkyl" and "alkyl*" are each independently straight-chain and branched alkyl groups having 1–7 carbon atoms.

32. A liquid crystal mixture according to claim 1, wherein the medium additionally comprises one or more compounds selected from formula XVIII

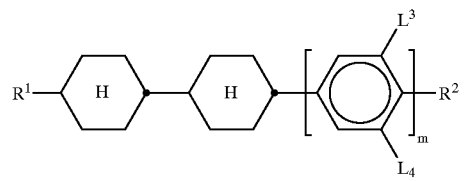

XVIII in which $R^1$ is an alkenyl radical having from 2 to 7 carbon atoms, $R^2$ is a halogenated or unsubstituted alkyl radical having up to 12 carbon atoms, where one or more CH$_2$ groups may be replaced, in each case independently of one another, by —CH=CH—, —C≡C—, —O—, —CO—O— or —O—CO— in such a way that O atoms are not linked directly to one another, or $R^2$ Q—Y alternatively is 1, Q is CF$_2$, OCF$_2$, CFH, OCFH or a single bond, Y is F or Cl, $L^3$ and $L^4$ are each, independently of one another, H or F, and m is 0 or 1.

* * * * *

UNITED STATES PATENT AND TRADEMARK OFFICE
CERTIFICATE OF CORRECTION

PATENT NO. : 6,677,003 B2
APPLICATION NO. : 09/982188
DATED : January 13, 2004
INVENTOR(S) : Dagmar Klement It is certified that error appears in the above-identified patent and that said Letters Patent is hereby corrected as shown below:

Column 40, line 13, reads "one or more compound" should read -- one or more compounds --
Column 42, line 25, reads "XIII XIII" should read -- XIII --
Column 44, line 29, reads "Q-Y alternatively is 1," should read -- is alternatively Q-Y, if m is 1, --

Signed and Sealed this

Third Day of November, 2009

David J. Kappos
*Director of the United States Patent and Trademark Office*